United States Patent [19]

Okutomi et al.

[11] Patent Number: 5,409,723
[45] Date of Patent: Apr. 25, 1995

[54] DOUGH COMPOSITION FOR PUFF PASTRIES

[75] Inventors: Yasuo Okutomi; Shinji Tanaka, both of Tokyo, Japan

[73] Assignee: Asahi Denka Kogyo Kabushiki Kaisha, Tokyo, Japan

[21] Appl. No.: 967,121

[22] Filed: Oct. 27, 1992

[30] Foreign Application Priority Data

Nov. 13, 1991 [JP] Japan .................. 3-297497

[51] Int. Cl.[6] ................... A23C 15/04; A21D 13/08
[52] U.S. Cl. ................................... 426/559; 426/607
[58] Field of Search ............ 426/607, 603, 556, 559, 426/553

[56] References Cited

U.S. PATENT DOCUMENTS

| | | |
|---|---|---|
| 2,592,224 | 4/1952 | Wilson et al. . |
| 3,568,463 | 3/1971 | McMichael et al. . |
| 3,985,911 | 10/1976 | Kriz et al. . |
| 4,275,082 | 6/1981 | Dougan ............ 426/556 |
| 4,391,838 | 7/1983 | Pate ................. 426/606 |
| 4,533,561 | 8/1985 | Ward ............... 426/603 |
| 4,622,226 | 11/1986 | Ke .................... 426/556 |
| 5,080,915 | 1/1992 | Zock ................ 426/556 |
| 5,167,975 | 12/1992 | Tsurumaki ....... 426/556 |

FOREIGN PATENT DOCUMENTS

| | | | |
|---|---|---|---|
| 0251375 | 1/1988 | European Pat. Off. ............ 426/559 |
| 0369516 | 5/1990 | European Pat. Off. . | |
| 0509566 | 10/1992 | European Pat. Off. ............ 426/559 |
| 3816978 | 12/1988 | Germany . | |
| 54-129150 | 10/1979 | Japan . | |
| 58-155043 | 9/1983 | Japan . | |
| 59-11142 | 1/1984 | Japan . | |
| 1205729 | 9/1970 | United Kingdom . | |

OTHER PUBLICATIONS

"Surfactants and Shortenings in Cakemaking", *The Bakers Digest*, vol. 52, No. 1, Feb. 1978, pp. 29–38.

*Primary Examiner*—Carolyn Paden
*Attorney, Agent, or Firm*—Young & Thompson

[57] ABSTRACT

The dough composition for puff pastries of the present invention comprises a fat composition which contains at least 30% by volume, based on the whole of the crystal aggregates, of crystal aggregates having a $\beta'$- or intermediate crystal form and a size exceeding 10 $\mu$m.

3 Claims, 1 Drawing Sheet

DOUGH COMPOSITION FOR PUFF PASTRIES

BACKGROUND OF THE INVENTION

1. Field of the Invention

This invention relates to a highly nervous dough composition for puff pastries which is excellent in puffing properties and mechanical resistance.

2. Description of the Prior Art

In the production of puff pastries such as pies, croissants and Danish pastries, a margarine, which is to be used exclusively therefor, shows a high plasticity and a high nerve and has a viscous and tough texture, is folded in or incorporated into a dough to thereby give puff pastries having a characteristic layered structure. Various attempts have been made, from the viewpoints of compositions and production methods, in order to impart desirable puffing characteristics to conventional fat compositions for puff pastries. It is believed, in particular, that smaller fat crystals would give a fat composition for puff pastries a dough with a more dense structure, a higher nerve and a better extensibility. Thus, there has been widely employed open type cooling drum complecters which can give fat compositions containing small fat crystals and having a high nerve and an excellent extensibility as compared with closed-type continuous tube coolers. From the viewpoint of the composition, it has been attempted to minimize changes in the solid fat content (SFC) within the working temperature range by adding liquid oils to high-melting fats or to improve the folding-in performance by combining various emulsifiers with each other (refer to Japanese Patent Laid-Open No. 155043/1983 and No. 11142/1984).

U.S. Pat. No. 2,592,224 describes a margarine wherein the fat crystal size is controlled. However, this patent aims at disclosing a method for producing a margarine exhibiting a good meltability in the mouth and a good spreadability. Accordingly, it differs from the present invention in object. Further, the expression of "the good spreadability" of the margarine described in the specification of the U.S. Patent means that the margarine can be easily spread on, for example, bread. Therefore, "the good spreadability" as used in the above U.S. Patent is contrary, in a certain sense, to the high nerve at the extension to be established in the present invention. In addition, the crystal size of the margarine described in the U.S. Patent ranges from 3 to 10 $\mu$m.

The recent consumers' preference toward high-grade products presents a demand for fat compositions for puff pastries having an improved meltability in the mouth. When the melting point of a fat component is lowered, however, the plasticity and the nerve over a wide temperature range are damaged, which makes the handling of the fat composition difficult and deteriorates the puffing properties. Even when emulsifiers are combined with each other so as to improve the folding-in performance, as described above, the problems of changes in fat components and, in particular, a decrease in the melting point cannot be completely solved. As a result, the performance cannot be fully achieved in this case too.

In addition, the mass-production and mass-marketing of pastries in recent years have promoted the mechanization and automation of pastry production lines. As a result, an intense compressive force and an intense extensive force are applied to a fat for puff pastries which has been folded or incorporated in a dough. Accordingly, fats for puff pastries which have an excellent mechanical strength, namely, never becoming dull but remaining nervous are needed. However conventional fats for puff pastries cannot satisfy this requirement.

SUMMARY OF THE INVENTION

Accordingly, it is an object of the present invention to provide a highly nervous dough composition for puff pastries which exhibits a good meltability in the mouth, excellent puffing properties and a high mechanical resistance.

The present inventors have attempted to solve a problem that the performance of a fat for puff pastries is deteriorated by lowering the melting point of its oil components in order to improve the meltability in the mouth thereof and, further, to develop a highly nervous dough for puff pastries which has a high mechanical strength and is, therefore, suitable for automated production lines. In order to achieve these objects, they have conducted extensive studies from the viewpoint of improving not the composition of a dough composition for puff pastries but a method for producing the same, i.e., improving the crystal state of a fat for the fat composition for puff pastries. As a result, they have successfully found out that a dough composition for puff pastries satisfying the above-mentioned requirements, which does not suffer from any deterioration in the performance as a dough composition for puff pastries when the melting point of its oil components is lowered or when it is processed in an automated production line, can be obtained by adding crystal aggregates of a specified crystal form and a specified size to the fat composition at a specified ratio.

The present invention, which has been completed based on the above-mentioned finding, provides a dough composition for puff pastries comprises a fat composition which wherein at least 30% by volume, based on the whole of the crystal aggregates, of crystal aggregates have a $\beta$- or intermediate crystal form and a size exceeding 10 $\mu$m.

Furthermore, the present invention provides a dough composition containing the above-mentioned fat composition for puff pastries according to the present invention and a puff pastry produced from said dough composition.

The fat composition of the dough composition for puff pastries of the present invention exhibits a good meltability in the mouth, excellent puffing properties, a high mechanical resistance and a high nerve. More specifically, it exerts the following effects.

The fat composition of the dough composition for puff pastries of the present invention sustains a good folding-in performance without being affected by the melting point of the oil components.

Dough compositions, in which the fat composition for puff pastries of the present invention is rolled, and puff pastries obtained by baking said dough compositions are highly excellent products. In addition, these dough compositions and puff pastries can be stored in a frozen state and excellent products can be obtained after thawing them.

DETAILED DESCRIPTION OF THE INVENTION

Now, the dough composition comprising a fat composition for puff pastries according to the present invention will be described in detail while comparing with conventional ones.

Figure 1:
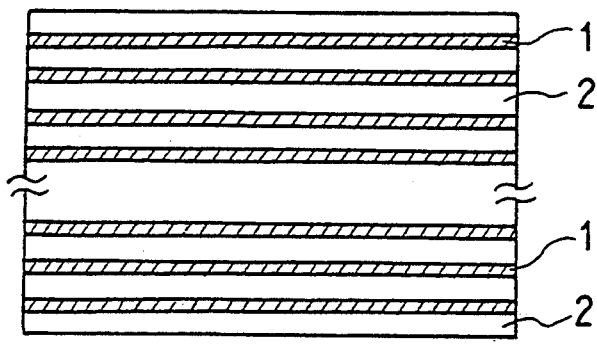
FIG. 1 is an enlarged schematic sectional view of a dough, in which a fat composition for puff pastries has been folded, before molding.

The section of a common dough, in which a dough for puff pastries has been incorporated, before molding has a repeated structure consisting of fat layers 1 and dough layers 2, as FIG. 1 shows. In this case, the thickness of the fat (namely, the thickness of a single fat layer) is calculated in accordance with the following Numerical formula 1. When the folding number of the dough at the molding is 4×3×3×4 (144 layers), the content of the folded-in fat is 50% by weight based on the dough, the final dough thickness is 3mm, the specific gravity of the dough is 1.20 and the specific gravity of the fat is 0.95, for example, the fat thickness is approximately 8 μm, as the following Numerical formula 2 shows.

[Numerical formula 1]

$$D_2 = [10\rho_d/(\rho_0 + 10^{-2} \times \rho_d \times \chi)] \times (\chi/X) \times D_3$$

wherein
$\rho_d$: specific gravity of dough,
$\rho_0$: specific gravity of fat,
$\chi$ (% by weight based on dough): amount of folded-in fat,
$X$: folding number,
$D_2$ (μm): fat thickness after laminating, and
$D_3$ (mm): final dough thickness.

[Numerical formula 2]

$$D_2 = [10 \times 1.20/0.95 + (1.20 \times 50) \times 10^{-2}] \times (50/144) \times 3 = 8.06 \text{ (μm)}.$$

Figure 2:
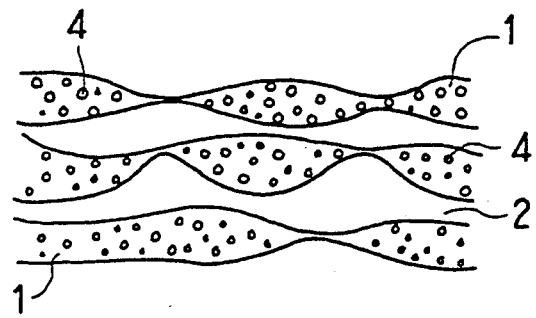
FIG. 2 is an enlarged schematic sectional view of a dough, in which a conventional fat composition for puff pastries has been folded, after molding.
Figure 3:
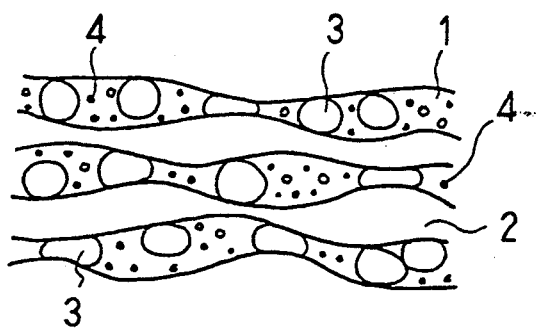
FIG. 3 is an enlarged schematic sectional view of a dough, in which a dough composition for puff pastries of the present invention has been folded, after molding.

However a conventional fat for puff pastries contains less than 30% (in most cases, 0% or, if any, less than 10%) of crystal aggregates exceeding 10 μm in size. Namely, the content of crystal aggregates exceeding 10 μm in size in such a conventional fat composition for puff pastries is much smaller than that in the fat composition for puff pastries of the present invention. In the course of the production of pastries, therefore, the nerve of the conventional fat composition for puff pastries is lost due to various physical impacts, for example, extension of the dough on a reverse sheeter and compression and spreading with the use of a pump for supplying a given amount of fat and a roller for spreading the dough. As a result, the dough layers 2 are liable to adhere to each other, as FIG. 2 shows. In this case, the inner layers of the baked puff pastry cannot be clearly separated from each other and thus less uniform layers are formed. In the case of the fat composition for puff pastries of the present invention containing at least 30%, based on the whole of the crystal aggregates, of fat crystal aggregates exceeding 10 μm in size, on the other hand, a number of crystal aggregates 3 exceeding 10 μm in size are contained in the fat layers 1, as FIG. 3 shows. Thus, the dough layers do not adhere to each other and, as a result, a satisfactory pastry product can be obtained after baking.

Figure 4:
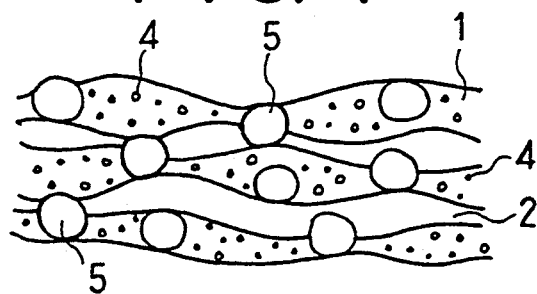
FIG. 4 is an enlarged schematic sectional view of a dough, in which a dough composition for puff pastries containing β-form large single crystals has been folded, after molding.

In the present invention, the crystal aggregates 3 exceeding 10 μm in size have a β'- or intermediate-type crystal form and, therefore, entirely differ from β-form large single crystals which are obtained by slowly cooling molten fat. As FIG. 4 shows, when a fat composition for puff pastries containing β-form large single crystals 5 is folded in, these crystals having physically stiff properties damage the dough layers 2 during the folding-in procedure. Thus no good puff pastry can be obtained thereby. In contrast, the fat composition for puff pastries of the present invention is deformed to some extent by external forces while sustaining a suitable mechanical resistance, seemingly in virtue of the β'- or intermediate crystal form crystal aggregates 3 exceeding 10 μm in size, and hence the dough layers 2 are not damaged and excellent puff pastries are obtained in this case.

The size distribution of fat crystal aggregates in the present invention is determined by the following crystal grain size measurement method.

<Crystal grain size measurement method>

Device

Laser diffraction grain size distribution analyzer SALD-1100 (manufactured by Shimadzu Corporation)

Procedure (1) A cold solvent for dispersing fat (2-butanol:methanol=90:10) is degassed.
(2) A fat sample to be analyzed is dispersed in the degassed cold solvent by ultrasonication under cooling until a size equilibrium is achieved.
(3) The measurement is effected at a given temperature within a range of from 5° to 15° C. (the data are based on volume).

The fat composition for puff pastries of the present invention contains generally at least 30% (by volume), preferably at least 40% by volume and still preferably at least 50% by volume, of fat crystal aggregates exceeding 10 μm in size based on the whole of the crystal aggregates, though the content may vary depending on the properties of the employed oil components. When the content of the crystal aggregates is smaller than 30%, no desired improvement in the nerve can be established and only a poor mechanical strength is obtained in the folding-in stage.

Now, the fat composition for puff pastries of the present invention and a method for producing the same will be described in detail.

As the fat constituting the fat composition for puff pastries of the present invention, one or more materials selected from among natural fats and oils such as palm oil, soybean oil, rapeseed oil, rice oil, sunflower oil, safflower oil, beef tallow, milk fat, lard, cacao butter, fish oil and whale oil and those obtained by subjecting these natural fats and oils to one or more treatments, for example, hydrogenation, fractionation or transesterification, may be cited.

Similar to common fat compositions for puff pastries, the fat composition for puff pastries according to the present invention may further contain, in the oily phase, emulsifiers, for example, saturated monoglycerides, unsaturated monoglycerides, diglycerides, sucrose fatty acid esters, sorbitan fatty acid esters, propylene glycol fatty acid esters, organic acid monoglycerides, polyglycerol fatty acid esters, polyglycerol condensed ricinoleic acid esters, lecithin and lecithin decomposition products, antioxidants, pigments and perfumes.

Although the fat composition for puff pastries according to the present invention may be free from water, it may contain an aqueous phase. In this case, the aqueous phase may contain, if needed, dairy products, for example, milk, whole fat milk and defatted milk, common salt, water-soluble perfumes, sugars, for example, sucrose, isomerized sugars and inverted sugars), fruit or vegetable purees, juices and condensates thereof and lactic acid fermentation products thereof as taste components.

In the fat composition for puff pastries of the present invention, the content of the aqueous phase may range from 0 to 60% by weight, while the content of the oily phase may range from 40 to 100% by weight.

In the production of the fat composition for puff pastries according to the present invention, the precrystallization method is employed so as to obtain crystal aggregates of a given size. More specifically, the material mixture is not simply quenched and doughed but subjected to two-stage or multi-stage cooling. As a machine for producing margarine, a closed-type continuous tube cooler such as a votator, a combinator or a perfecter or an open-type cooling drum complecter is employed.

Namely, the fat composition for puff pastries of the present invention is produced in a conventional manner by oil-in-water emulsifying the material mixture in a preemulsifying tank, pasteurizing the obtained emulsion if required, and then precooling it in a cooling tube.

In the case of a shortening to which no aqueous phase is added, the oil-soluble components are dissolved in the oily phase in the preemulsifying tank in a conventional manner, followed by pasteurizing and precooling.

The optimum precooling temperature usually falls within a range from 20° to 30° C., though it varies depending on the composition. Next, the emulsion is passed through a unit B (a pin-machine) or a holding tube to thereby allow the precipitation and growth of high-melting fat crystals of a given size.

It is necessary to control the precooling temperature and the capacity of the unit B and/or the holding tube in such a manner as to give at least 30% by volume of fat crystal aggregates exceeding 10 $\mu$m in size based on the whole of the crystal aggregates of the product to be produced. Then quenching and doughing (the main cooling) are effected in the cooling unit to thereby precipitate the residual fat crystals. The temperature of the composition at this point is usually from 10° to 20° C. Next, the composition is passed through a resting tube, if needed, and molded on a packaging machine. When a cooling drum is used in the main cooling stage, the composition is kneaded on a complecter and then molded on a packaging machine.

It is recommended that the fat composition for puff pastries of the present invention be used in a dough composition at a ratio of from 15 to 60% by weight based on the dough. For example, a preferable dough comprises, per 100 parts by weight of wheat flour, from 0.5 to 2.0 parts by weight of common salt, from 1 to 10 parts by weight of a fat to be incorporated and from 40 to 60 parts by weight of water. In addition, it may contain egg products such as whole egg or yolk, dairy products such as skim milk powder, taste components such as cinnamon or coffee and/or dough-improving agents such as emulsifiers, ascorbic acid and cysteine.

The dough composition according to the present invention may be obtained by folding in the above-mentioned fat composition for puff pastries into the above-mentioned dough in a conventional manner at the ratio as specified above.

In order to obtain puff pastries by baking the above-mentioned dough composition, the dough composition may be molded as such, followed by final proofing (in the case of a fermented dough) and baking. Alternately, the dough is temporarily stored in a frozen state, either before or after molding, and the subsequent operations are effected when needed to thereby give baked puff pastries.

To further illustrate the present invention in greater detail, and not by way of limitation, the following Examples and Comparative Examples will be given. Unless otherwise noted, all "parts" and "%" given in these examples are by weight. Examples 1 to 4 and Comparative Examples 1 to 8

Fat compositions for puff pastries of the compositions as specified in Table 1 were obtained by the production methods as described below.

(Production method)

(1) Starting fats were blended and heated to 70° C. Next, an emulsifier (a saturated monoglyceride) was completely dissolved therein.

(2) In each of Examples 1 to 3 and Comparative Examples 1 to 3 and 5 to 7, an aqueous solution of common salt (common salt and water) was added to the oily phase under stirring and preemulsification was performed.

(3) Subsequently:
(i) In each of Examples 1 to 4, a fat composition was produced by the precrystallization method with the use of a perfecter.
(ii) In each of Comparative Examples 1 to 4, a fat composition was produced by the common quenching/ doughing method with the use of a perfecter.
(iii) In each of Comparative Examples 5 to 8, a fat composition was produced with the use of a cooling drum (quenching) and a complecter.

(4) Each of the fat compositions thus produced by the method as specified in the above item (3) was molded into a sheet, packaged and aged in a refrigerator for 2 to 3 days.

TABLE 1

| | | (unit: % by weight) | | | |
|---|---|---|---|---|---|
| | | Ex. 1 Comp. Ex. 1, 5 | Ex. 2 Comp. Ex. 2, 6 | Ex. 3 Comp. Ex. 3, 7 | Ex. 4 Comp. Ex. 4, 8 |
| Oily phase | hardened fish oil (open-tube m.p.: 30° C.) | 40 | 10 | — | 49 |
| | hardened soybean oil (open-tube m.p.: 36° C.) | 20 | 50 | 40 | 25 |
| | palm oil (open-tube m.p.: 34° C.) | 20 | 20 | 20 | 25 |
| | hardened palm oil (open-tube m.p.: 40° C.) | — | — | 20 | — |
| | saturated monoglyceride | 1 | 1 | 1 | 1 |
| Aqueous | common salt | 1 | 1 | 1 | — |

TABLE 1-continued

|  | (unit: % by weight) | | | |
| --- | --- | --- | --- | --- |
|  | Ex. 1 Comp. Ex. 1, 5 | Ex. 2 Comp. Ex. 2, 6 | Ex. 3 Comp. Ex. 3, 7 | Ex. 4 Comp. Ex. 4, 8 |
| phase    water | 18 | 8 | 18 | — |

(Test on physical properties)

The size distribution of each of the fat compositions for puff pastries obtained in the above Examples 1 to 4 and Comparative Examples 1 to 8 was determined by the method, as described above.

The hardness of each of the above-mentioned fat compositions for puff pastries was expressed in the yield value measured with a rheometer (manufactured by Fudo Kogyo K.K. ).

The nerve of each of the above-mentioned fat compositions for puff pastries was measured with a device similar to the one proposed by A. J. Haighton et al. [refer to JAOCS 42, 27–30 (1965)] and expressed by the work softening (W) which was calculated in accordance with the following Numerical formula 3.

[Numerical formula 3]

$$W = (C_U - C_W)/C_U \times 100\%$$

wherein $C_U$: compression stress before work softening (g/cm$^2$);

$C_W$: compression stress after work softening (g/cm$^2$).

A fat of a smaller W value means a more nervous ore.

The following Table 2 summarizes the data.

TABLE 2

|  |  | *2 (%) | Hardness (5 mm disc, g/cm$^2$) | | | W (%) | Crystal form |
| --- | --- | --- | --- | --- | --- | --- | --- |
|  | *1 |  | 10° C. | 15° C. | 20° C. |  |  |
| Ex. |  |  |  |  |  |  |  |
| 1 | Precrystn. method | 52 | 1530 | 920 | 390 | 43 | α'- *I |
| 2 |  | 38 | 1840 | 1210 | 540 | 46 | β' |
| 3 |  | 85 | 2530 | 1660 | 710 | 46 | β' |
| 4 |  | 89 | 1820 | 1110 | 360 | 48 | β' |
| Comp. Ex. |  |  |  |  |  |  |  |
| 1 | Quenching/ | 5 | 2030 | 900 | 160 | 53 | β' |
| 2 | doughing/ | 2 | 3160 | 1600 | 290 | 54 | β' |
| 3 | method | 3 | 4250 | 2140 | 400 | 56 | β' |
| 4 |  | 10 | 2920 | 1630 | 150 | 59 | β' |
| 5 | *3 | 12 | 1210 | 530 | 90 | 53 | β' |
| 6 |  | 5 | 1620 | 970 | 130 | 51 | β' |
| 7 |  | 8 | 2080 | 1250 | 310 | 50 | β' |
| 8 |  | 15 | 1580 | 900 | 80 | 55 | I* |

Note
*1: production device and production method,
*2: proportion of crystal aggregates exceeding 10 μm in size,
*3: cooling drum complecter method,
W: work softening (15° C.), and
I*: intermediate form.

As the above Table 2 shows, the proportion by volume of crystal aggregates exceeding 10 μm in size in each of the fat compositions for puff pastries of Examples 1 to 4 ranges from 38 to 89%, while that of each of the Comparative Examples 1 to 8 ranges from 2 to 15%. When the hardnesses of these fat compositions for puff pastries are compared with each other based on the yield values measured with the rheometer, the products of the Comparative Examples 1 to 4 (obtained by quenching/doughing) are very hard at 10° C. while the products of the Comparative Examples 5 to 8 (obtained with the use of the cooling drum complecter) are considerably softened at 20° C. Thus it has been found out that the products of the Examples 1 to 4 (the fat compositions for puff pastries of the present invention products) suffer from relatively little change within the temperature range for roll-in.

The measurement of the work softening (W) at 15° C. revealed that the products of the Examples 1 to 4 according to the present invention had smaller W values, suffered little change in hardness after softening and remained highly nervous as compared with the products of the Comparative Examples 1 to 8.

(Pie baking test)

By using each fat composition for puff pastries obtained in the above Examples 1 to 4 and Comparative Examples 1 to 8, a pie baking test was effected by the following method.

Namely, a dough of the composition as specified in the following Table 3 was sufficiently kneaded and stored in a retarder. Then it was thinly extended and 800 g of the fat composition for puff pastries was placed thereon. After folding in 3×4×3×4, the composite material was molded and baked into a pie.

The roll-in state (extensibility, breakage of oily film, etc.) during the production of the pie and lifting and the conditions of the inner layer of the obtained baked pie were evaluated. Table 4 summarizes the results. The conditions of the inner layer were evaluated with the naked eye, while the lifting was calculated in accordance with the following Numerical formula 4.

[Numerical formula 4]

Lifting (time) = (thickness of baked pie)/thickness of unbaked and molded dough).

As Table 4 clearly shows, each of the fat compositions for puff pastries of the Examples 1 to 4 was superior, in the roll-in state and the conditions of the inner layer, to those of the Comparative Examples 1 to 8 and showed a sufficient lifting. Thus, it is obvious that the fat compositions for puff pastries according to the present invention are excellent. Among the products obtained by using the cooling drum complecter (i.e. the Comparative Examples 5 to 8), the one of the Comparative Example 5 comprising low-melting fats was completely incorporated into the dough in the roll-in stage and, as a result, the baked pie was unsatisfactory in the lifting and the conditions of the inner layer. Among the products obtained by the quenching/doughing method (i.e., the Comparative Examples 1 to 4), the fats contained in those of the Comparative Examples 2 and 4 could not be extended but broken in the roll-in stage. As a result, the baked pies thus obtained had poor inner layers.

TABLE 3

| Composition of dough: | |
| --- | --- |
| Material | Content (g) |
| Hard wheat flour | 700 |
| Soft wheat flour | 300 |
| Shortening (for incorporation) | 50 |
| Water | 520 |
| Common salt | 10 |

TABLE 4

|  | Roll-in state | Lifting (time) | Condition of inner layer |
| --- | --- | --- | --- |
| Ex. 1 | ◉ | 10.0 | ◉ |

TABLE 4-continued

|  | Roll-in state | Lifting (time) | Condition of inner layer |
| --- | --- | --- | --- |
| Ex. 2 | ⊙ | 11.0 | ⊙ |
| Ex. 3 | ⊙ | 10.5 | ⊙ |
| Ex. 4 | ⊙ | 10.0 | ⊙ |
| Comp. Ex. 1 | ⊙ | 8.5 | ○ |
| Comp. Ex. 2 | Δ | 7.5 | X |
| Comp. Ex. 3 | X | 6.5 | X |
| Comp. Ex. 4 | ○ | 7.5 | Δ |
| Comp. Ex. 5 | Δ | 6.0 | X |
| Comp. Ex. 6 | ○ | 7.5 | Δ |
| Comp. Ex. 7 | ⊙ | 9.0 | ○ |
| Comp. Ex. 8 | ○ | 6.0 | X |

Note:
Criteria for evaluation
⊙: best,
○: good,
Δ: somewhat poor, and
X: poor.

What is claimed is:

1. A dough composition for puff pastries comprising a fat composition wherein at least 30% by volume, based on the whole of the crystal aggregates, of crystal aggregates have a $\beta'$- or intermediate crystal form and a size exceeding 10 μm, said crystal aggregates having been obtained by a precrystallization method at a pre-cooling temperature ranging from 20° to 30° C.

2. The dough composition as claimed in claim 1, wherein said fat composition for puff pastries is used in said dough composition at a ratio of from 15 to 60% by weight based on a dough.

3. A puff pastry produced from the dough composition as claimed in claim 1.

* * * * *